United States Patent

[11] 3,596,242

[72] Inventor Thomas W. Skweres
     Lisle, Ill.
[21] Appl. No. 790,982
[22] Filed Jan. 14, 1969
[45] Patented July 27, 1971
[73] Assignee Ross and White Company
     Wheeling, Ill.

[54] SPEED WARNING SYSTEM
     7 Claims, 10 Drawing Figs.
[52] U.S. Cl. .................................................. 340/62,
     324/160, 324/163, 340/31, 322/10
[51] Int. Cl. .................................................. B60q 1/00
[50] Field of Search .................................... 340/62,
     263, 31; 134/123; 246/182; 322/1, 10, 11, 12;
     324/160, 161, 163, 180

[56]                References Cited
            UNITED STATES PATENTS
2,229,234  1/1941  Williams ........................  340/31
2,325,435  7/1943  Sykora ..........................  340/31
3,024,795  3/1962  Roller ..........................  134/23

Primary Examiner—John W. Caldwell
Assistant Examiner—Robert J. Mooney
Attorney—Rummler and Snow ABSTRACT: The disclosure describes a signal system for drive-through plural-station wash racks and the like providing progressive visible or audible signals relative to the speed of the vehicle so that the driver is alerted to control the vehicle speed within optimum or recommended values for greatest washing efficiency of the rack. In one embodiment a green light indicates to the driver that the vehicle is progressing from station to station at the recommended speed, an amber light alerts the driver that the vehicle is exceeding the recommended speed and a red light and audible signal indicates continued excessive speed. Other embodiments are disclosed.

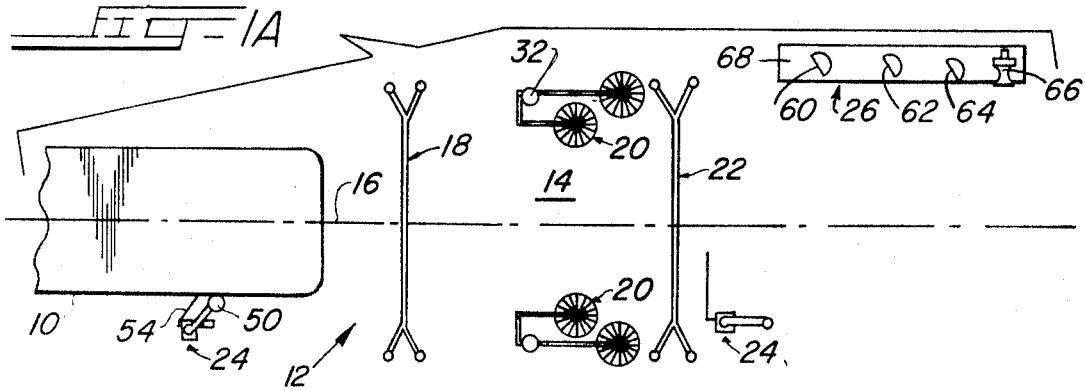
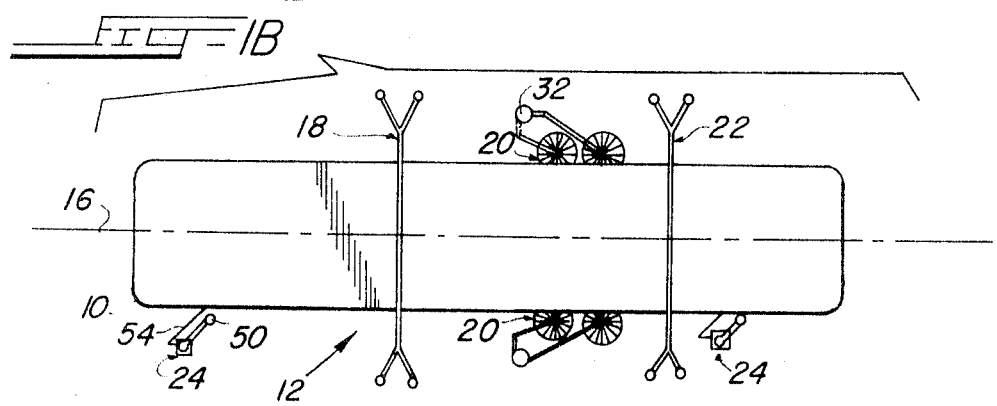
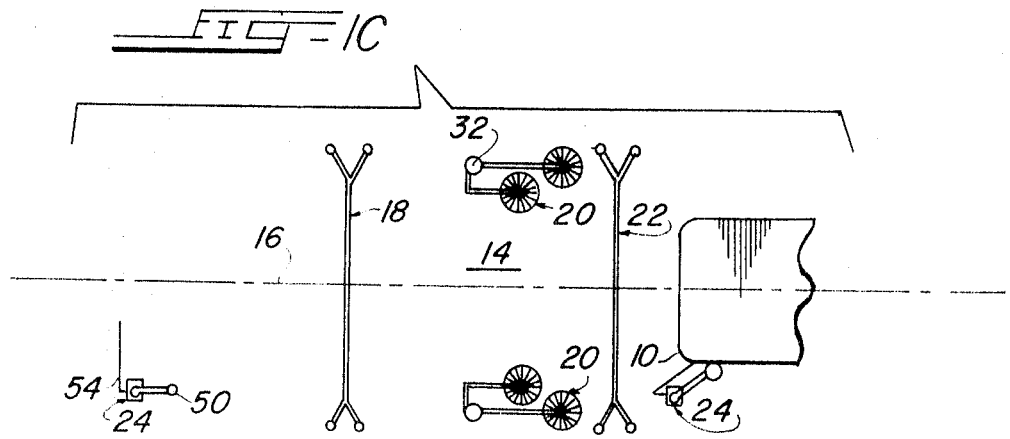

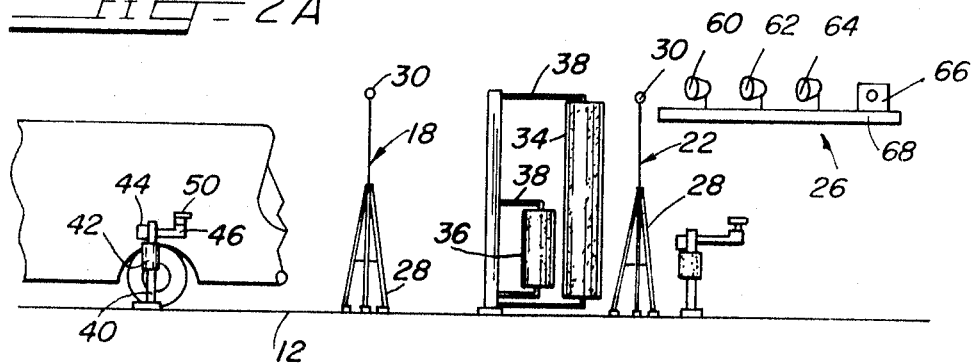
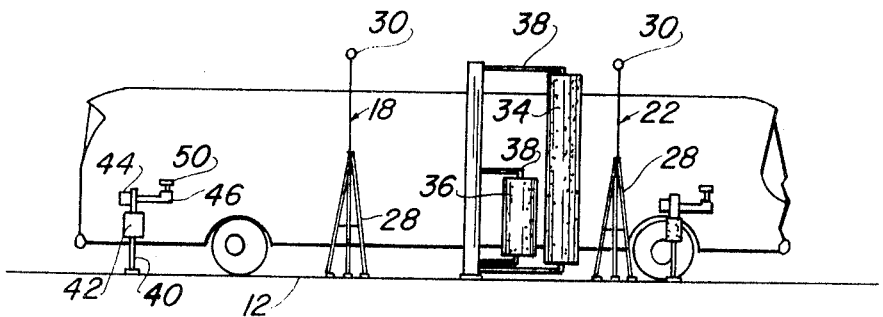
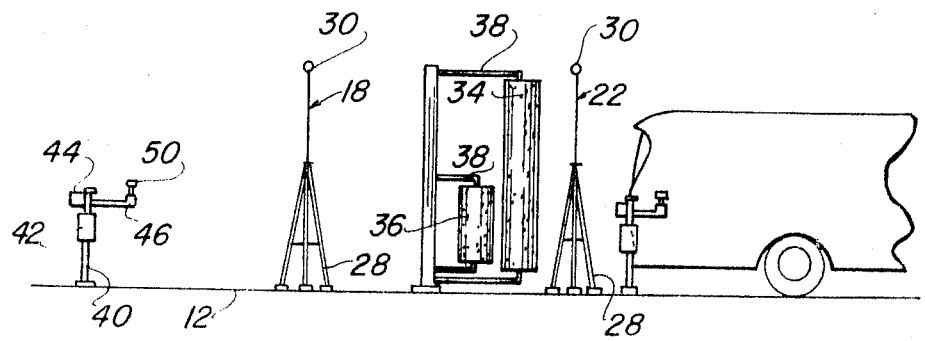
INVENTOR.
THOMAS W. SKWERES

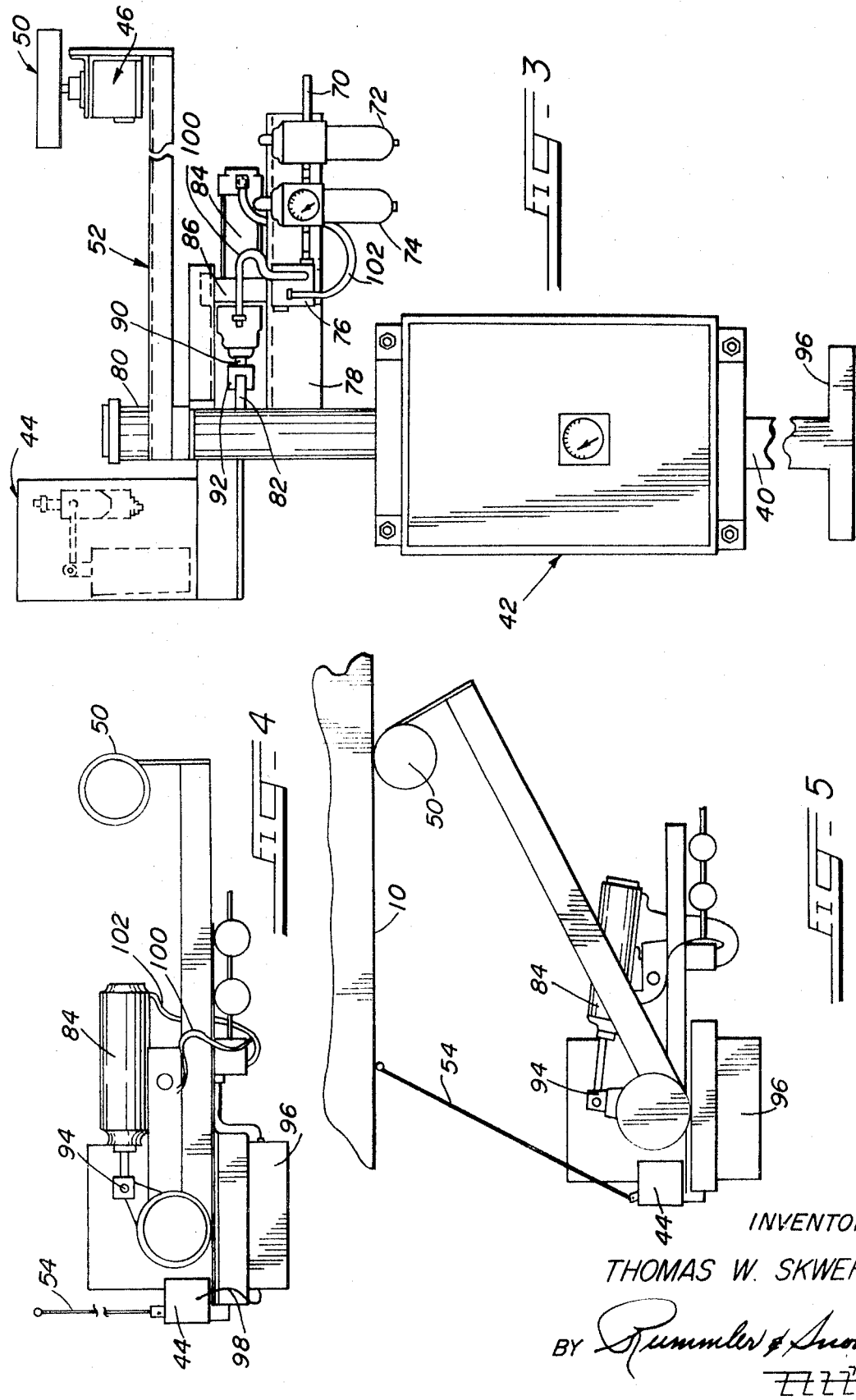

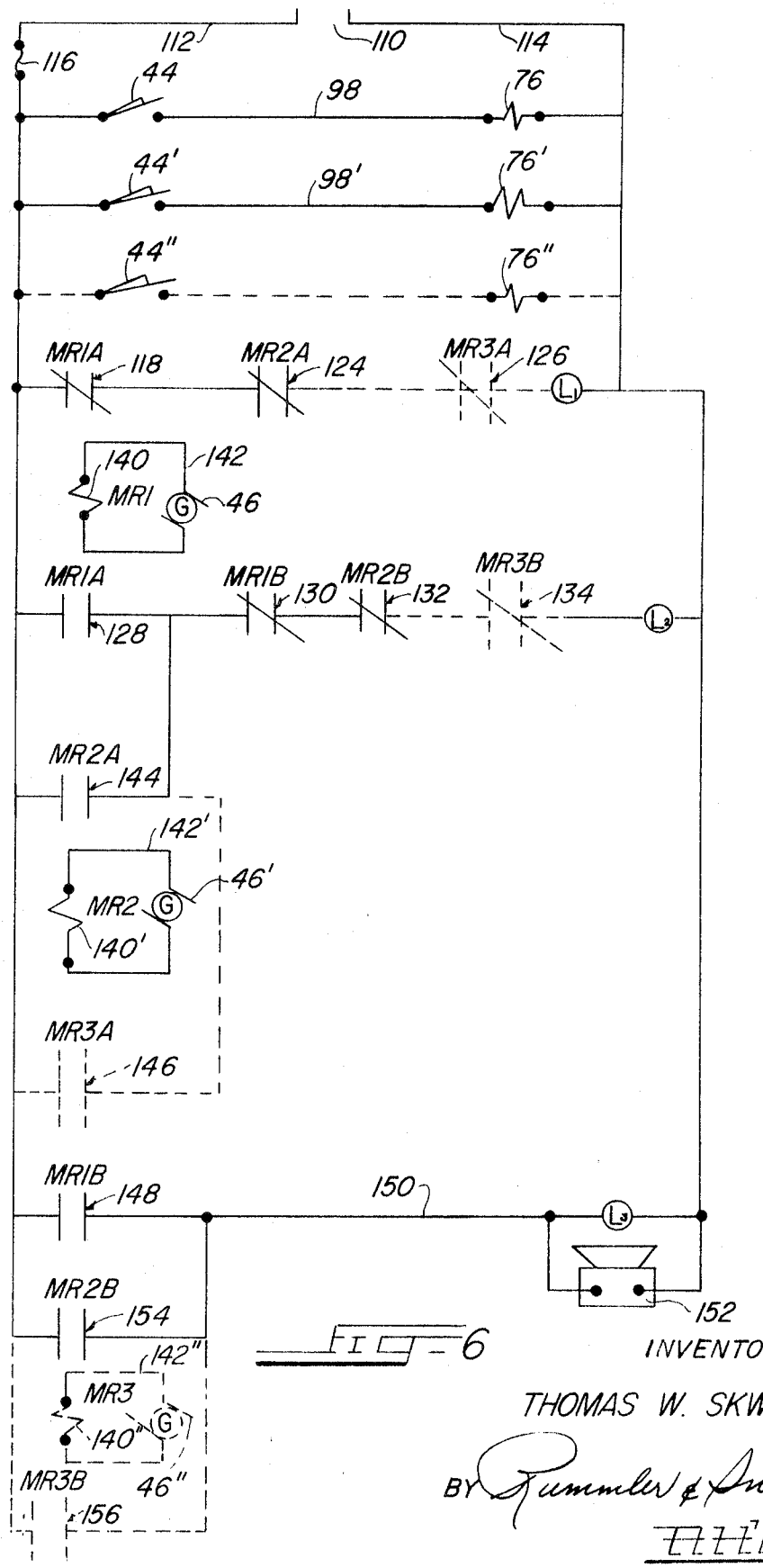

SPEED WARNING SYSTEM

BACKGROUND OF THE INVENTION

Multiple-stage or station wash racks for motor vehicles and trains are known wherein the vehicle is driven through spaced devices or arches adapted to prewet the body of the vehicle, spray a detergent wash solution thereon, applying rotating cylindrical scrubbing brushes to the sides, top, front and back of the vehicle and finally spray rinse water over the entire vehicle. For this purpose, in some wash racks, the vehicle is towed through the stations by means of a continuously moving chain having spaced hook means which attach to a convenient part of the undercarriage, such as the front axle. Such devices are set to move the vehicle at a predetermined speed so that the operations of each stage are carried out with maximum effectiveness. The operations of automatic machines of this type also include wheel washing brushes which spin the wheels on driven rollers while in contact with hydraulically operated brushes and simultaneously streams of wash solution followed by rinse water are jetted against the wheels and tires.

In these commercial establishments such as railroads and bus companies, the vehicles are more cumbersome and heavy, requiring expensive equipment to incorporate fully automatic towing and washing principles. Consequently vehicles of this type are generally regularly washed in drive-through equipment to ready the vehicle for the current or next day's operation. The tendency is for the drivers to drive through too fast to allow sufficient time for complete washing or rinsing at each station in the rack, particularly where a large number of vehicles are processed per day.

The instant invention provides means to alert the driver so that he can control the vehicle speed to any predetermined values found to be optimum for the particular washing apparatus. By these means the flow of many vehicles through the wash rack can be properly scheduled and conducted for maximum use of the equipment during the sequence of maintenance operations being conducted and also insure that the time spent in washing the vehicles is worthwhile by producing the best washing job within the capabilities of the particular wash rack being used.

SUMMARY OF THE INVENTION

The invention concerns one or more speed-warning devices giving visible and audible signals of vehicle speed as the driver passes through the stages of the wash rack including a vehicle-operated generator, the output of which sequentially actuates a series of switches and relays connected to the signal system. In one embodiment a unitized speed warning device is provided for location along the path of the vehicle through the wash rack, having a pivotally mounted generator with trip switch means actuated by the body of the vehicle to automatically swing the generator and its drive wheel into operable relation with the side of the vehicle whereby the forward motion of the vehicle turns the generator and the speed of the generator or current output controls or actuates the signal system.

By using two or more spaced generator stations, the device can be adapted to accommodate long vehicles such as buses and train cars with facility. The units are adapted to be spaced longitudinally of the wash rack so as to be out of the way of the actual washing operation and also not interfere with the normal line of travel of the vehicle, whether such be a relatively straight line, such as a railroad or an irregular line as may be transversed by a bus under normal steering conditions.

DESCRIPTION OF THE DRAWINGS

FIGS. 1A, 1B and 1C are top plan views, partially diagrammatic, of a wash rack for buses employing the signal system and unitized speed warning device of this invention and showing a bus passing through the stages of operation of the rack;

FIGS. 2A, 2B and 2C are side elevational views partially diagrammatic of the wash rack of FIGS. 1A, 1B and 1C showing the relationship of the parts in the respective stages of washing the bus;

FIG. 3 is a side elevational view of the unitized speed warning device of this invention;

FIG. 4 is a top plan view of the unitized speed warning device showing the position of the parts when there is no vehicle in the wash rack;

FIG. 5 is a top plan view of the unitized speed warning device showing the position of the parts in contact with the side of a vehicle; and FIG. 6 is an electrical diagram of the circuit and component parts of the signal system.

THE PREFERRED EMBODIMENT

Referring to the drawings particularly FIG. 1A there is shown a vehicle 10 progressing under the control of a driver along the driveway surface 12 into the wash rack 14. The general line of vehicle travel is indicated by the arrow 16. The wash rack 14 comprises the prewet arch 18, the side washers 20 and the rinse arch 22. This wash rack system has been augmented by the speed warning devices 24 positioned respectively fore and aft of the wash rack 14, and the signal lights 26.

The prewet arch 18 has the frame members 28 supporting the arcuate pipe 30 at a width and height sufficient to clear the sides and top of the vehicle 10. The pipe 30 is connected to a supply of water, not illustrated. Means are also included to control the temperature of the water and also inject metered amounts of a detergent or water softener to aid the washing process. The arches 18 and 22 can be of any suitable type capable of wetting the sides and top of the vehicle 10 with the wash and rinse solution. The arches can be manually or automatically controlled as desired.

The side washers 20 comprise a stand 32 affixed to the driveway 12, having a long fiber rotating brush 34 adapted to scrub the entire side of the vehicle and a shorter long fiber brush 36 adapted to scrub the lower contours of the body where greater accumulations of dirt and road film are generally found. The brushes are supported on vertical axes from the respective brackets 38 adapted to be swung from the retracted position shown in FIG. 1A to the contact position shown in FIG. 1B mechanically or automatically through known types of hydraulic and electrical controls. Each brush is driven by an electric motor to rotate in either direction as desired, i.e., so that the bristles travel with the direction of the vehicle 10 and at a faster rate or against the direction of travel. The brackets 38 can comprise conduits for injection of additional wash solution through the bristles from a hollow axle as is known in the art. The rinse arch 22 is constructed substantially the same as the prewet or wash arch 18.

The arrangement illustrated in FIGS. 1A, 1B and 1C is dimensioned for an elongated vehicle 10 which may represent a bus. For this purpose, and for illustrative purposes only, the prewet and rinse arches are placed about 16 feet apart along the direction of travel with the side washers 20 being positioned at an intermediate point, such as 10 feet forward of the prewet arch.

In accordance with this invention, the speed warning devices 24 are provided in such positions along the driveway 12 that the approach of the vehicle to the wash rack is sensed and the speed detected before the prewet arch 18 is encountered and the overall speed of the vehicle is detected and monitored until it has cleared the last washing means or the rinse arch. In a special installation for elongated vehicles such as a bus, the speed warning devices are positioned 30 feet from each other. The entry speed warning device being eleven feet in advance of the prewet arch and the exit warning device being about 3 feet from the rinse arch. In order for the driver to see the signal lights at all times during the washing operation, they are placed about 45 feet ahead of the exit speed warning device.

The speed warning devices 24 each comprise a stand or stanchion 40 supporting a control panel 42, a trip switch 44 and a generator 46 with a drive wheel 50. The generator and drive wheel are carried on the end of the rotatable arm 52 controlled by means to swing the arm radially about the stand 40 so that the drive wheel 50 contacts the side of the vehicle at a signal from the switch 44 as controlled by the elongated feeler 54. The frictional contact of the drive wheel 50 on the side of the vehicle rotates the generator and produces a current signal proportional to speed. The signal 26 comprises a red light 60, an amber light 62, a green light 64 and a horn signal 66, mounted on the bracket 68.

Through the electrical and hydraulic control system, to be described, the operation of the device is as follows:

As the vehicle approaches the prewet arch, stage 1, represented by FIGS. 1A and 2A, the first hip (or trip) switch 44 is actuated through the feeler 54 striking the front end of the vehicle and being held in the actuated position by the side panel of the vehicle. This causes the swing arm of the speed warning device 24 to rotate instantaneously and bring the drive wheel 50 into frictional contact with the side of the vehicle. If the preselected speed for the vehicle is maintained by the driver the green light 64 is lighted. If the prescribed speed is exceeded, the drive wheel 50 produces more current through the generator 46 and energizes a meter relay to be described to cause the amber light 62 to be lighted. As the vehicle proceeds and the speed remains unchanged, the amber light will remain "ON" or if the speed is dropped to the optimum preselected speed the amber light goes "OUT" and the green light goes "ON." However, if the speed is increased as the vehicle enters or proceeds through stage No. 1, the generator produces more current and the red light 60 goes "ON" and the bell 66 produces an audible signal. This gives both a visual and audible warning to the driver which cannot be ignored.

In stage No. 2, FIGS. 1B and 2B, as the vehicle front starts to clear the rinse arch, the front end contacts the feeler 54 of the second hip switch 44 and the second speed warning device is activated. During this stage both warning devices are operating in unison and a moment later the first hip switch 44 clears the rear end of the vehicle and only the second speed warning device controls the warning system during stage No. 3, FIGS. 1C and 2C. This gives a continuous indication of the vehicle speed through the washing arches. During this latter stage No. 3, any changes in the vehicle speed are indicated by the warning lights and bell as before.

At the end of stage No. 3, FIGS. 1C and 2C, the rear of the vehicle reaches the point where the second feeler 54 clears the end of the vehicle and monitoring of the vehicle speed ceases as well as the rinsing operation.

Referring to FIG. 3, the details of one of the speed warning devices is shown to include the air line 70 connected to the filter 72 and combination regulator and lubricator 74 connected to four-way solenoid operated air valve 76, which components are supported by the bracket 78 extending in a fixed position from the stanchion 40.

The bracket 52 is rotatably mounted on the stanchion 40 by means of the cap 80 and has the operating arm 82 affixed thereto so that rotation of the arm 82 rotates the bracket 52. The bracket 78 supports on its inner side the air cylinder 84 by means of the pivot 86 supported at the top by the brace 88.

The air cylinder is thus pivotally mounted on a vertical axis and has the reciprocating rod 90 affixed to the operating arm 82 by means of the yoke 92 and the pin 94. The entire unit is affixed to the floor by means of the base plate 96 (FIG. 4). The electrical connections for the hip switch 44 are shown at 98. The air hoses 100 and 102, leading from the valve 76, convey air under pressure, from a source not shown, to either side of the piston in the air cylinder 84 so that the bracket 52 is swung from the position shown in FIG. 4 to the position shown in FIG. 5 upon actuation of the hip switch and reversed on deactivating the hip switch. The feeler 54 is in relative close proximity to the drive wheel 56 so that the movement of the drive wheel is always against the side of the vehicle or away from the side and does not swing the extended position (FIG. 5) before the vehicle arrives or does not run off the end of the vehicle. The arcuate swing of the bracket 52, without the vehicle 10 present, is greater than that necessary to bring the drive wheel 50 into contact with the side of the vehicle, when present, so that the drive wheel is maintained in driving contact therewith.

Referring to FIG. 6, the essential components of the circuit are shown to include a source 110 of 120 volt, single phase AC current connected by means of lines 112 and 114 and a fuse (5 amp) 116 to the hip switches 44 and 44' and the respective four-way solenoid valves 76 and 76' which operate through their air hoses 100 and 102 in the control of the generators indicated at 46 and 46' respectively. This part of the circuit is connected in parallel and includes a third hip switch 44'' and solenoid valve 76'' as optional circuitry as desired and shown in dotted lines. The meter relay contacts 118 are connected thereacross in series with the meter relay contacts 124 and 126 (optional) to the light $L_1$, in this instance representing the green signal light. The contacts 124 and 126 are normally closed.

The meter relay circuit includes the normally closed contacts 128, 130, 132 and 134 (optional) connected in series with the signal light $L_2$ which represents the amber light of the warning system. The generators 46, 46' and 46'' (optional) are shown with their relay actuators 140, 140' and 140'' through their auxiliary circuits 142, 142' and 142'' as the sources of variable 12 volt direct current to actuate the relays. The meter relay circuit has the normally open contacts 144 and 146 connected in parallel across the contact 128; contact 146 being optional. Lastly the meter circuit has the normally open contacts 148 connected by the line 150 to the light $L_3$ and in parallel with the horn or bell 152, and the normally open contact 154 in parallel with the contact 148. Again the normally open contact 156 is included where the optional third generator 46'' is used.

The operation of the device is as follows, assuming two speed warning devices 24 are used. Before the vehicle 10 approaches the wash rack 14 the green signal light $L_1$ is already energized through the normally closed contacts 118 and 124. As the forward end of the vehicle approaches the wash area it trips the hip switch 44 and energizes the solenoid valve 76. This allows the actuation of the air cylinder 84 and moves the generator 46 and its drive wheel 50 into contact with the side of the moving vehicle. The rotation of the wheel 50 produces DC voltage in the circuit 142 which is proportional to the speed of the moving vehicle. This generator output is fed into the meter relay circuit. When the maximum appropriate vehicle speed is reached the generator output is sufficient to activate the meter relay contact 128. At this time the normally closed contact 118 opens to deenergize the green signal light $L_1$, and at the same time the normally open contact 128 closes to energize the amber signal light $L_2$.

When the maximum appropriate vehicle speed is exceeded the output of the generator 46 becomes sufficient to close the meter relay contact 148 and this allows the contact 128 to open and deenergize the amber signal light. The closing of contact 148 energizes the red signal light $L_3$ and the horn or bell 146. As the vehicle proceeds the functions of the generators 46 and 46', when both are in contact, work simultaneously to control the signal lights.

During the operation of the wash rack if the vehicle speed is reduced sufficiently the generator output from the generators 46 or 46' is reduced to return the meter contacts 140 and 140' to their normal position. This means that the green signal light $L_1$ will again be energized and the amber signal light $L_2$ or the red signal light $L_3$ and the horn 146 will be shut off. If an additional speed warning unit is used, such as the generator 46'', the function would be as above described.

In the preferred embodiment the generator 46 is of the magneto type and the meter relay 116 is a DC meter having a needle or arm which moves proportional to the DC voltage and makes or breaks contact points to activate or deactivate the control relays to the signal lights.

I claim:

1. A device for indicating the relative speed of a vehicle along a drive path comprising
   a. a generator provided with a drive wheel and adapted to produce an electrical signal proportional to the speed of rotation of said drive wheel,
   b. switch means responsive to the presence of a vehicle on said drive path,
   c. means responsive to said switch means to move said drive wheel in contact with a longitudinal surface of said vehicle,
   d. relay means connected to and responsive to the signals of said generator to be opened and closed thereby, and
   e. means responsive to the positions of said relay means to indicate the speed of said vehicle.

2. A device in accordance with claim 1 in which
   a. said generator and associated drive wheel are mounted upon a pivotable arm supported from an upright stancheon at the side of said drive path, and
   b. hydraulic means responsive to said switch means are provided to pivot said arm and move said drive wheel into contact with the side of the vehicle.

3. A device in accordance with claim 1 in which said switch means comprise a hip switch mounted at the side of said drive path and provided with a feeler arm extending into the path of the longitudinal surface of said vehicle.

4. A device in accordance with claim 1 including
   a. a wash rack having wash and rinse means extending over and along said drive path whereby visual indices of the speed of said vehicle through said wash rack is made apparent through said signal means to the driver of the vehicle.

5. A device for indicating the relative speed of a moving vehicle through a wash rack comprising
   a. a stancheon at the entrance and exit of the wash rack said stancheons being spaced from each other a distance less than the length of the vehicle and being adjacent the path of said vehicle therethrough,
   b. a generator pivotally mounted from an arm upon each of said stancheons and provided with a drive wheel the rotation of which produces a voltage signal proportional to the speed of travel of said vehicle,
   c. means to pivot said generator with the drive wheels into contact with the side of said vehicle at each of said stancheons,
   d. a hip switch having a feeler responsive to the presence of a vehicle in the path of said wash rack and connected to said means to rotate said arm and said generator, and
   e. light means responsive to the signals of said generator to produce a visual indication to the driver of the speed of the vehicle.

6. A device in accordance with claim 5 in which
   a. said light means include a green light to indicate a normal speed through said wash rack,
   b. an amber light to indicate a speed approaching the maximum allowable speed through the wash rack for efficient washing operations, and
   c. a red light and audible signal to indicate an excessive speed.

7. A device in accordance with claim 5 in which
   a. said generator is a magneto type producing a DC voltage proportional to the speed of rotation, and
   b. including relay means connected through a multicontact DC meter, whereby said contacts are progressively activated and deactivated to control said light means.